United States Patent [19]

Jakubowicz

[11] 4,052,320

[45] Oct. 4, 1977

[54] TELESCOPING SERUM SEPARATOR AND DISPENSER

[75] Inventor: Raymond F. Jakubowicz, Manchester, N.Y.

[73] Assignee: Eastman Kodak Company, Rochester, N.Y.

[21] Appl. No.: 703,476

[22] Filed: July 8, 1976

Related U.S. Application Data

[63] Continuation-in-part of Ser. No. 609,121, Aug. 29, 1975, abandoned.

[51] Int. Cl.[2] .................... B01D 21/26

[52] U.S. Cl. .................... 210/516; 23/258.5 R; 128/2 F; 128/2 G; 128/DIG. 5; 210/DIG. 23; 222/522; 233/1 R; 233/26

[58] Field of Search .................... 210/65, 78, 83, 360 R, 210/361, 460, 512, 516, DIG. 23, DIG. 24; 128/2 F, 2 G, 213, 272, 276, DIG. 5; 23/258.5 R; 233/1 R, 26; 222/522, 523

[56] References Cited

U.S. PATENT DOCUMENTS

| | | | |
|---|---|---|---|
| 1,006,078 | 10/1911 | Fulford | 222/523 |
| 2,851,066 | 9/1958 | Ott et al. | 222/522 X |
| 3,135,261 | 6/1964 | Carroll | 128/DIG. 5 |
| 3,433,216 | 3/1969 | Mattson | 128/276 X |
| 3,645,253 | 2/1972 | Goverde et al. | 128/2 F |
| 3,647,070 | 3/1972 | Adler | 210/83 |
| 3,648,684 | 3/1972 | Barnwell et al. | 128/2 F |
| 3,687,296 | 8/1972 | Spinosa et al. | 128/2 F X |
| 3,706,305 | 12/1972 | Berger et al. | 128/2 F |
| 3,706,306 | 12/1972 | Berger et al. | 128/2 F |
| 3,750,645 | 8/1973 | Bennett et a. | 210/DIG. 23 |
| 3,771,965 | 11/1973 | Grams | 210/83 X |
| 3,779,383 | 12/1973 | Ayres | 210/DIG. 23 |
| 3,780,935 | 12/1973 | Lukacs et al. | 210/83 X |
| 3,800,947 | 4/1974 | Smith | 210/DIG. 23 |
| 3,849,072 | 11/1974 | Ayres | 233/26 X |
| 3,850,174 | 11/1974 | Ayres | 128/272 |
| 3,852,194 | 12/1974 | Zine, Jr. | 210/83 |
| 3,890,956 | 6/1975 | Moorehead | 128/2 F |
| 3,897,902 | 8/1975 | Yanez, Jr. | 233/26 |
| 3,905,528 | 9/1975 | Maiocco | 210/DIG. 23 |
| 3,920,549 | 11/1975 | Gigliello et al. | 210/DIG. 23 |
| 3,931,815 | 1/1976 | Takatsuki | 128/2 F |
| 4,012,325 | 3/1977 | Columbus | 210/516 |

*Primary Examiner*—Frank W. Lutter
*Assistant Examiner*—Richard L. Chiesa
*Attorney, Agent, or Firm*—Dana M. Schmidt

[57] ABSTRACT

A serum separation and dispensing device comprises two containers one movably mounted partially within the other, the end wall of one being sealed, in the contracted position, against the open end of the other, to hold a vacuum prior to drawing blood into the device.

22 Claims, 8 Drawing Figures

FIG. 1
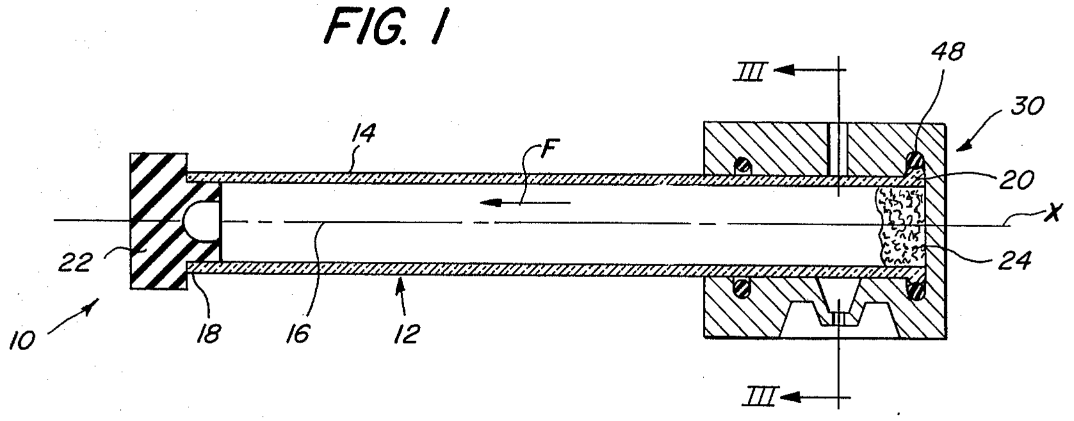
FIG. 2
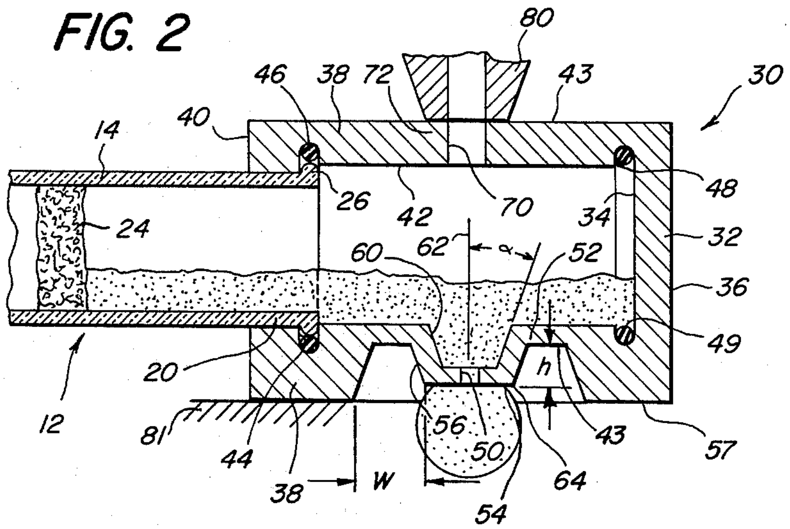
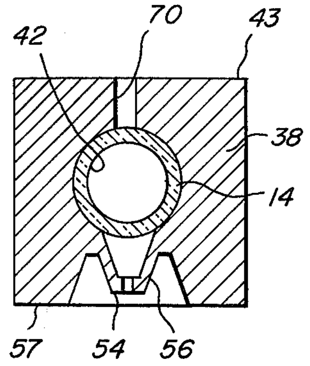
FIG. 3
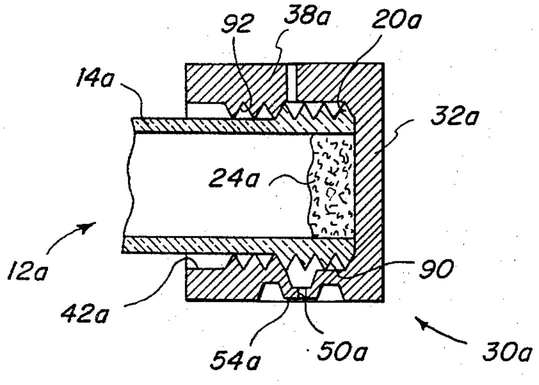
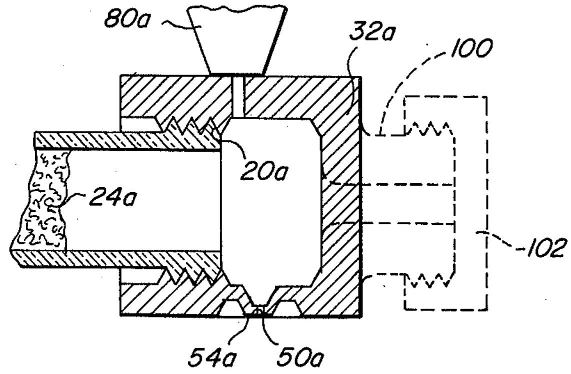
FIG. 4
FIG. 5

TELESCOPING SERUM SEPARATOR AND DISPENSER

RELATIONSHIP TO COPENDING PARENT APPLICATIONS

This is a continuation-in-part application of U.S. Ser. No. 609,121 filed on Aug. 29, 1975, entitled "Telescoping Serum Separator and Dispenser" now abandoned.

BACKGROUND OF THE INVENTION

1. Field of the Invention

This invention generally relates to a container which provides for the collection of a sample of a biological fluid, the centrifugation of the fluid in the case of serum, and accurate dispensing of micro amounts of the fluid for testing, all without requiring the pouring of the fluid into a variety of separate containers. More specifically, it relates to improved devices for providing the combined functions of serum separation and dispensing.

2. State of the Prior Art

The most common conventional method of providing biological fluid such as blood serum for clinical analysis utilizes a plurality of containers en route to the actual test. That is, the blood sample is conventionally collected in an evacuated container, and separation of the serum from the whole cells may be achieved by centrifuging the sample within that container, or within another container to which the sample has been transferred. Thereafter, the serum is commonly poured off into yet another container for the desired clinical testing. All such transfer operations are time consuming, requiring either hand processing or complicated, expensive automatic handling. Furthermore, whenever there is a transfer of a liquid sample to a separate, open container, the sample is aerated and $CO_2$ loss or gain can occur. There is also the danger of improper transfer, either by the use of the wrong container, by the improper patient labeling of the new container, or by both. Still further, contamination of the serum by foreign materials or infection of the operator can occur. Reuse of the same dispensing device for sequential samples requires careful sterilization to avoid contamination. Thus, a system which keeps the blood sample confined to essentially one container from its collection to the actual dispensing for analysis is a distinct, sought-after improvement.

At the centrifuging stage, a variety of means have been provided for more or less plugging the serum-cell interface that is formed during centrifuging, whereby remixing of the cells and serum is prevented. U.S. Pat. Nos. 3,647,070; 3,779,383; 3,780,935; 3,800,947; 3,849,072 and 3,850,174 are representative of devices of this nature. The disclosures of U.S. Pat. Nos. 3,647,070; 3,779,383; 3,800,947 and 3,849,072 are typical of mechanical valve devices which prevent flow across the interface. Such devices, however, are quite complicated, resulting in increased cost of manufacture. Furthermore, they are susceptible to mechanical failure and do not automatically seek out the serum-cell interface. Devices such as are shown in U.S. Pat. No. 3,779,383 are not provided with valve means at the serum end to permit ready removal of the serum. Instead, the plug must be removed and the serum either poured off, as by tilting the container, or it must be aspirated or otherwise drawn off.

Of the many devices available to provide blood serum for analysis, the one which has become the norm is the evacuated container. This is simply a partially evacuated glass tube open at one end except for a septum placed there. One improvement over such an evacuated container which is particularly useful comprises a glass tube open only at one end, a septum affixed to that end when the tube is evacuated, and a movable plug contained within the tube. The plug is preferably a silica gel, with or without a plastic cup-like mandrel positioned with its open end pointed to the septum. By reason of the vacuum, collected blood is easily drawn into the container. The container is then spun about a centrifuge axis adjacent to the septum end, and the gel by reason of its selected specific gravity works up to the serum-cell interface where it plugs the container against remixing of the serum and cells. An example of such a container but without the mandrel is shown in U.S. Pat. No. 3,852,194.

Although such a device is useful in separating the serum from the cells, it has not avoided the transfer difficulties noted above. Furthermore, by pouring out the serum through the theretofore septum-plugged end, it is possible to contaminate the serum with blood cells which collected at the septum-container interface prior to centrifuging, a condition known as "blood-ring contamination".

Other patents relating to blood serum separation in general are U.S. Pat. Nos. 3,645,253; 3,687,296; 3,706,305; 3,706,306; and 3,771,965. Some of these, while not relying on a plug to provide a barrier between serum and cells, use a filter to separate serum from the blood cells.

RELATED APPLICATIONS

Commonly owned U.S. Application Ser. No. 539,558 filed on Jan. 8, 1975 by David S. Smith, entitled "Biological Fluid Dispenser" now U.S. Pat. No. 3,977,568, discloses dispensing devices which can be added to a serum container of any type, and which feature a dispensing chamber having a drop-forming platform, and a valve for temporarily blocking flow of serum into the chamber. The valves disclosed include a shear valve, and in each case the valve seat and closure member are disclosed as being separate from the serum container and the dispensing chamber.

Commonly owned U.S. Application Ser. No. 581,345, filed on May 27, 1975 by Richard L. Columbus, entitled "Biological Fluid Dispenser and Separator", a continuation-in-part application of Ser. No. 539,557 filed Jan. 8, 1975, now U.S. Pat. No. 4,012,325 discloses an improved serum separator in which a dispensing portion can be an integral or added part. In that separator, both of the opposite ends of the separation compartment are accessible, permitting the serum to be drawn off at the end opposite to the blood intake end so as to provide a number of superior advantages when the separator is used with a phase-separating gel. To dispense serum, the device features a chamber, a drop-forming platform, and a blocking means such as a valve, positioned between the serum-separation compartment and the platform. As in the Smith application, the blocking means is a separate part. In one embodiment, the phase-separating gel is used to complete the enclosed, pressurized confines for the serum during the dispensing stage. In that embodiment, a separate, rotating valve mounted within the dispensing chamber is used prior to dispensing to block the apertures in the side walls of the dispensing chamber.

Although the devices of the Columbus application have provided significant improvements over previous designs, they have been more difficult to seal if an evacuated mode, as opposed to a vented mode, of blood intake is used, due in part to the valve disposed at the serum outlet end. Such valves, while functioning well as a liquid control, are not as effective in preventing air leakage into the evacuated serum separation portion of the container, particularly when the containers must be stored in such an evacuated condition for long periods.

OBJECTS OF THE INVENTION

It is an object of the invention to provide a serum separation and dispensing device wherein the contents can be readily vacuum sealed for vacuum assist in blood intake, without danger of leakage.

It is another object of the invention to provide such a device wherein no additional valve is required as a separate part to prevent premature flow of serum into the dispensing portion.

It is a related object of the invention to provide such a device in a manner which results in a minimal increase in volume for the serum separation device, at least during the separation stages.

Yet another object of the invention is to provide such a device which provides all the functions of blood collection, separation, and dispensing with a minimum of steps and apparatus required.

Other objects and advantages will become apparent upon reference to the following "Summary" and "Detailed Discussion", when read in light of the attached drawings.

SUMMARY OF THE INVENTION

This invention concerns a blood handling device for separating and dispensing blood serum, wherein the dispensing portion and the separating portion themselves provide, relative to each other, a valve for preventing premature flow of serum from one to the other. More specifically, there is provided a blood serum dispensing device, comprising two containers movably mounted one within the other, one of the containers being a compartment having opposed ends, one end being open for fluid communication with respect to the other container; the other container comprising an end wall, and opposed side walls extending from one surface of the end wall and encompassing at least the open end of the one container; at least one of the opposed walls being provided with an aperture capable of providing fluid communication into or out of the other container from the exterior surface thereof; the end wall of the other container being removably sealed against the open end of the one container to prevent fluid flow therefrom, and the aperture being removably blocked from fluid communication with the one container, by the one container; and further including means for sealing together the opposed walls and the open end of the one container when the other container end wall is pulled away from the open end, so as to permit fluid flow from the open end to the aperture.

BRIEF DESCRIPTION OF THE DRAWINGS

FIG. 1 is a sectional view along the axis of a serum separator and dispenser device constructed in accordance with the invention;

FIG. 2 is an enlarged, fragmentary sectional view similar to that of FIG. 1, but illustrating the dispensing portion in its extended position with a pressurizing means juxtaposed;

FIG. 3 is a sectional view taken generally along the line III—III of FIG. 1;

FIG. 4 is a fragmentary sectional view similar to that of FIG. 1, but illustrating an alternate embodiment;

FIG. 5 is a view similar to that of FIG. 4, except that the dispensing portion is shown in its expanded, dispensing position, a further modification being illustrated in phantom;

DESCRIPTION OF THE PREFERRED EMBODIMENTS

Figure 6:
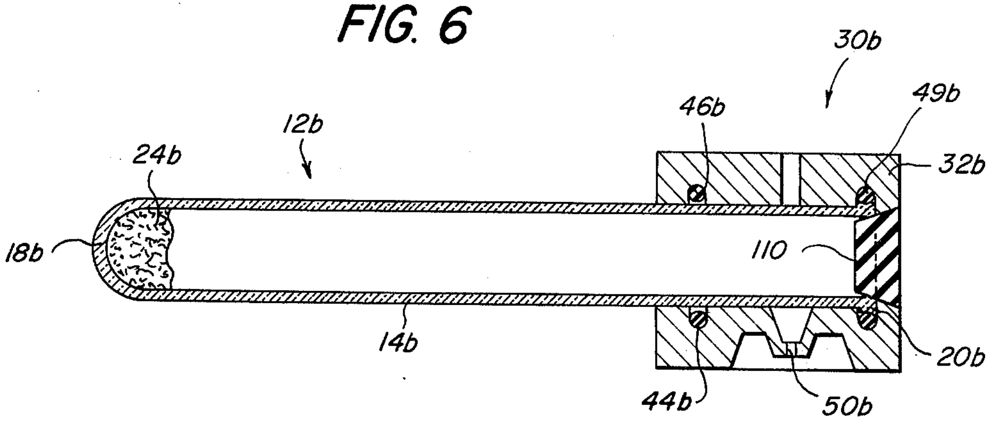
FIG. 6 is a sectional view similar to that of FIG. 1, but illustrating yet another embodiment.

The invention is intended for use in the dispensing of blood sera directly from blood separators onto suitable substrates, for clinical analysis. Typical of such substrates are those shown, for example, in commonly owned U.S. Application Ser. No. 538,072, entitled "Integral Analytical Element", filed by E. Pryzbylowicz et al on Jan. 2, 1975 now U.S. Pat. No. 3,992,158. However, the apparatus of this invention is neither limited to use with just such substrates, nor to just the dispensing of drops of blood sera. Other fluids capable of being dispensed can also be handled by this apparatus.

As used in this application, terms such as "up" and "down" refer to the orientation of the disclosed parts during their actual use, in reference to the direction of the force of gravity.

As illustrated in FIG. 1, a separation and dispensing device 10 constructed in accordance with the invention preferably comprises two generally elongated containers 12 and 30 movably mounted, and specifically telescoped, one with respect to the other. Together the containers themselves form a valve which is closed when in the position of FIG. 1, but which is open when in the position shown in FIG. 2. Container 12 is the serum-separation portion or compartment, while container 30 is the dispensing portion that forms a dispensing chamber when moved to the position shown in FIG. 2.

Considering first container 12, it comprises a generally tubular wall 14 comprised of any suitable material and of any convenient shape such as can be achieved by opposed walls arranged about an axis 16 to define a blood separation compartment accessible at both ends 18 and 20, a closure means 22 such as a septum secured to end 18, and a movable plug 24 preferably comprising a silica gel. The septum 22 is adapted to be penetrated by a cannula in the conventional manner, and is therefore formed from a self-sealing elastomer. In this fashion, end 18 serves as the blood inlet end for the blood collection stage.

The gel for plug 24 can be a blend of hydrophobic silicon dioxide and a silicone, such as dimethylpolysiloxane, blended to give a thixotropic gel having a specific gravity between about 1.035 and 1.06, and preferably about 1.04–1.05, and a viscosity between about 400 and about 500 poise at a shear rate of about 500 $sec.^{-1}$, and typically 451 poise at 506 $sec.^{-1}$. The gel can be used by itself without a mandrel, as is taught for example in the aforesaid U.S. Pat. No. 3,852,194, or with a mandrel as manufactured for example by Corning Glass Works. End 20 can be provided with a rim 26 protruding outwardly away from the walls 14, FIG. 2, primarily for sealing that end with respect to the interior of container 30, as is described hereinafter.

As disclosed in the aforesaid application of Columbus, such a construction of container 12 permits a centrifugal force F, FIG. 1, to be applied towards the septum end 18 by spinning the device about a point of rotation "X" positioned adjacent end 20. The portion distal to end 20 becomes the cell-collecting portion of the compartment, and the portion proximal or adjacent to end 20 becomes the serum-collecting portion. The gel 24 thus is initially positioned in the serum-collecting portion, where it assists container 30 in closing that end off to fluid flow prior to centrifuging, thus permitting partial evacuation of the container. Furthermore, the plug formed by gel 24 serves as means for preventing any "blood ring" from forming at the seal formed by container 30 with the end 20, thus preventing "blood ring contamination".

It is not clear what the actual mechanism is for the gel-serum movement, but it is believed that, as soon as a centrifuging force F is applied sufficient to initiate separation of the serum, the gel moves and permits serum flow torwards end 20, due to the specific gravity of serum being lighter than that of the gel. If an imbedded mandrel is used (not shown), the gel has nowhere else to go, except into the mandrel which preferably has an open end directed towards the gel. After the separation is complete, the flow of the serum past the plug terminates and continued spinning causes the mass of the gel 24 to spread back into contact with the wall of container 12, FIG. 2, completing the sealing arrangement. By this means, gel 24 acts to maintain the separation of the two portions of the whole blood.

Plastic beads (not shown) can be used as a gel extender in lieu of the mandrel. The beads and/or mandrel move with the gel during centrifuging.

Referring now to FIG. 2 in particular, container 30 comprises an end wall 32 having an interior side or surface 34 and an exterior side or surface 36, and opposed side walls 38 extending from side 34, terminating at an end 40 of the container 30 opposite the end wall 32. The side walls 38 accommodate or encompass end 20 of the container 12, so that end 20 is movably mounted and specifically telescoped within end 40 of container 30. Preferably, the opposed walls 38 are arranged about an axis which is coincident with axis 16. Thus, as with container 12, the walls 38 can have a shape in which the walls form one continuous wall.

The walls 38 have an interior surface 42 and an exterior surface 43. The interior surface 42 can be cylindrical while the exterior surface 43 can be rectilinear (FIG. 3). Between the interior surfaces is the interior of the container 30. That interior is temporarily blocked from fluid flow of serum from end 20 of container 12 by virtue of the removable seal formed by side 34 of end wall 32 positioned against end 20. Interior surface 42 is further provided with means for sealing the interior of end 40 of container 30 against end 20 when that end has been unblocked by opposite end wall 32, and for slidably moving the container 30 to that unblocked position. The means permitting the movement of container 30 to the two positions is the approximate coincidence of the interior diameter of surface 42 of container 30 and the exterior diameter of walls 14. Flexibility of walls 38 permits the rim 26 to ride across the surface of walls 42. A preferred form of the sealing means in the unblocked positioning of container 30 is a groove 44 extending around the entire circumference of interior surface 42, shaped to mate with rim 26 of end 20. If desired, an O-ring 46 can be seated within the groove 44 to assist in the sealing. A similar construction can be given to the junction of side walls 38 with end wall 32, so as to form a groove 48 with an O-ring 49 seated therein.

Preferably, two apertures 50 and 70 are formed in portions 52 and 72, respectively, of the side walls 38, for the dispensing operation depicted in FIG. 2. These apertures preferably are constructed in the manner disclosed in the aforesaid Columbus application. Specifically, the portion 52 of the side wall 38 has a specially-constructed drop-forming platform 54 isolated from the rest of the exterior surface 43 by a connecting portion or surface 56, and surrounded by a protruding shoulder 57. Aperture 50 has an exit portion which is centered within the platform 54, and an entrance portion 58 in interior surface 42 of portion 52. By virtue of the connecting surface of portion 56, a second enlarged aperture 60 is formed, separating aperture 50 from the interior of the container 30.

The function of the platform 54 and aperture 50 is to accurately form successive drops of predictable and uniform volume, each of which is to be touched off on a suitable substrate. To provide this function with a fluid having such drastically varying properties as blood serum, certain features have been found to be useful. As disclosed in the aforesaid Columbus application, there preferably is a vertical separation of the platform 54 from the surface 43 by a distance "$h$", and a horizontal separation from shoulders 57 by a minimum width "$w$". Both of these preferably are such as to prevent a drop of blood serum from spreading from the platform to the remaining chamber portions prior to drop transfer. Such drop spreading would interfere with accurate drop transfer. It has been found that a suitable value for the height "$h$" is about 0.127 cm, while width "$w$" should be at least about 0.05 cm, and preferably about 0.127 cm. Furthermore, the surface of the walls immediately adjacent to platform 54, that is the connecting surface 56, preferably slopes away from a line 62 along which the force of gravity acts when the drop is formed, by an angle $\alpha$ which is between about 0° and about 15°. Negative angles are also usable. Any slope greater than this will encourage the drop to climb up and contact exterior surface 43, thus interfering with the proper drop size and drop removal.

To further insure that blood serum of the types commonly received from patients are properly dispensed as a drop from platform 54, in accurate micro-amounts, the following additional properties are desirable.

1. Aperture 50 preferably has a maximum dimension at the exterior surface of platform 54, measured transversely to fluid flow therethrough, which is less than that which will permit flow of blood serum under the influence of gravity and which is large enough to retard closure of the aperture by protein agglomeration. To perform this function with blood sera having a surface tension of between about 35 dynes/cm and about 75 dynes/cm, it has been found that the maximum dimension should be between about 0.025 and about 0.046 cm. This dimensional range appears to be operative even when the relative viscosity is as low as about 1.2 centipoises and is as high or higher than about 2 centipoises. The upper value can be increased if the head of fluid is correspondingly decreased as would be the case if the dimensions of the interior of container 30 were increased. In those instances where aperture 50 has the above-noted dimensions, typically the head of fluid above such an aperture, without gravity flow, can be 2.29 cm. However, such a head is not realized in this instance, because the height of fluid is reduced when container 30 is telescoped to the position shown in FIG. 2.

A particularly useful embodiment is one in which the platform aperture is generally circular in shape, with the circle diameter being 0.038 cm.

2. It is also preferred that the intersection of the aperture 50 with the platform surface be essentially a sharp edge, i.e., having a radius of curvature no greater than about 0.02 cm. Further, the platform should be free of protrusions such as portions of flashing, which would project either away from the platform or into the fluid passageway. Without such precision in the formation of the aperture, capillary effects would be increased, tending to cause premature fluid flow.

3. The transition zone between platform 54 and the connecting surface 56 defines an edge 64 which preferably is sufficiently sharp as to prevent the tendency of the serum drop to climb up the surface 56 under the influence of surface tension. For the range of fluids anticipated, it is preferred that the maximum radius of curvature to achieve such an effect does not exceed about 0.02 cm.

The effect of the preceding features is to confine the drop dispensed from the container 30 to the surface of the platform 54. It will be appreciated that the entire surface of the platform is contacted by the drop, and because the drop naturally assumes a quasi-spherical form, the contacted surface area of the platform will range from about 0.0026 sq. cm. for a 1 μl drop, to about 0.018 sq. cm. for a 30 μl drop. This represents a range in platform diameter, between edges 64, which is between about 0.05 cm and about 0.15 cm. Alternatively, the surface area supporting, and in contact with, the drop can be increased for a given drop volume and platform diameter by either (1) forming a downwardly projecting rim around edge 64, (2) making the platform surface concave or (3) roughening the surface of platform 54. Without such roughening, it has been found that a preferred surface smoothness is between about 1 to 30 RMS.

To assist in drop detachment and to minimize protein agglomeration in aperture 50, the platform 54 preferably has a cross-sectional thickness, measured along a plane extending perpendicular through the platform, which is no greater than about 0.025 cm. A particularly useful thickness is about 0.013 cm. The effect of such a construction is to minimize the neck of fluid connecting the drop to the main volume in container 30. This in turn permits rapid detachment with little secondary flow out of the container All of the above features can be obtained by forming the container 30 out of copolymers such as acrylonitrile-butadiene-stryene (ABS), and polymers such as poly(acetal), poly(propylene), poly(styrene) high density poly(ethylene), and polyesters.

Aperture 70 in portion 72 of side walls 38 is preferably positioned opposite the aperture 50, and need otherwise be constructed only as a passageway for pressurized gas generated exterior to the container.

The dispensing operation is achieved after the centrifugal separation of the serum, by sliding the container 30 so that end wall 32 no longer blocks end 20 of container 12, FIG. 2, and rim 26 is seated in groove 44 instead of groove 48. The serum is then free to flow into the dispensing chamber and into aperture 50. The dispensing chamber now comprises, in this expanded position, the end wall 32, side walls 38, the gel 24 sealing off the cell-portion of the blood, and the side walls 14 of the serum-collecting portion of container 12, including end 20. A suitable pressurizing means 80 can be used such as an air hose or a collapsible bellows such as is shown in commonly-owned U.S. Application Ser. No. 545,670, filed on January 30, 1975 now abandoned, by Richard L. Columbus, entitled "Metering Apparatus", the description of such bellows and its operation being hereby incorporated by reference. By properly increasing the pressure of the interior of container 30 by an amount just necessary to form a 10 μl drop, the drop will form as shown in FIG. 2. A suitable support can be used to hold the device during drop dispensing.

To insure that proper drop formation of predictable volume occurs the first time for a given pressure increase resulting from means 80, the total air volume above the serum surface should be minimized. Such a feature can be particularly significant where, as here, the air volume is increased drastically before dispensing can be achieved. It has been found that when the air volume above the serum in the dispensing chamber opened to the extended position is about 1300 μl, for example, no problem occurs in accurate dispensing. A typical example of dimensions for containers 12 and 30 which provide this volume is one in which container 20 has an internal diameter of about 0.85 cm between walls 14 and gel 24 is located about 3.6 cm from end 20, and container 30 has an internal diameter between interior surfaces 42 of about 1.05 cm and a separation between grooves 44 and 48 of about 0.7 cm. In such a case, a typical amount of serum to be dispensed is about 1360 μl. The above-noted location of the gel occurs when a 50% gel separation occurs upon centrifuging of an 80% filled container 12 having an exterior length of about 7 cm.

As reported in the aforesaid Columbus Application Ser. No. 545,670, it has been found that a container 30 constructed as described above, when the contents are appropriately pressurized, repeatedly will give uniform volumetric drops of biological fluids, such as blood sera, even when the relative viscosity, surface tension and total protein content vary drastically as is characteristic of blood sera drawn from diseased as well as healthy patients. The coefficient of variation as is commonly used in statistical analysis has been found to be no greater than about 2% from the mean, thus insuring that repeated drops have about the same volume. This accuracy is achieved not only for blood serum, but also for other biological fluids such as Ringer's solutions and water.

It will thus be appreciated that containers 12 and 30 cooperate together to form a shear valve, in which the contracted or closed position of container 30, FIG. 1, results in apertures 50 and 70 being blocked by the serum-collecting portion of container 12, from fluid communication with end 20 of container 12. This is done without requiring a separate valve part. Serum flow is permitted, however, by sliding the two containers apart into the extended position shown in FIG. 2. Because the contracted position provides a completely telescoped fit of the two containers, the volume of the device in its serum-separation configuration is essentially the minimum, i.e., only the amount needed for the serum separation function.

A further advantage of the invention is that a substantial seal is provided by end wall 32 against end 20, sufficient even to maintain a partial vacuum as is customary in serum-collecting devices. Such a vacuum seal can be maintained even when container 12 is glass and container 30 is plastic, for example. Thus, the device of this invention provides a superior blood collecting device.

In addition to the glass and plastic embodiments shown, both containers can be made of other materials such as plastic, in which case the rim 26 on container 12 can be transferred to container 30 at end 40 to fit into a notch (not shown) in container 12 when the containers are telescoped together as in FIG. 1. When container 30 is moved to its expanded pressurizable position, an additional notch to be provided for the rim, or alternatively, the rim bearing against the walls 14 of container 12 provides adequate sealing during the dispensing operation.

Turning now to FIGS. 4 and 5, there is illustrated an alternate embodiment wherein the relative movable mounting of the two containers is achieved by means of a screw-thread. Parts similar to those previously described bear the same reference number to which the distinguishing suffix "*a*" has been added. Thus, the separation and dispensing device comprises a tubular wall **14*a* openable at two opposite ends, defining a serum separation compartment, and a dispensing portion or chamber 30*a* movably mounted with respect to, and encompassing end 20*a*of the container 12*a*, as in the previous embodiment. Also as before, end wall 32*a* is removably sealed against end 20*a* of the container; and, prior to centrifuging, a gel plug 24*a* is located in the serum-collecting portion of container 12*a* which is proximal to end 20*a***.

However, the relative movement between the two containers from their closed position, FIG. 4, to the extended position used in dispensing, FIG. 5, is achieved by means of a male threaded portion 90 at end **20*a* of container 12*a*, and a female-threaded portion 92 formed in the interior surface 42*a* the length of the opposed walls 38*a*. By unscrewing container 30*a* with respect to container 12*a*, the aperture 50*a*, constructed as before with a platform 54*a*, becomes unblocked by end 20*a*, so that the serum can flow from that end to the aperture. A further possible modification is a pour-off nozzle 100 bearing a screw-cap 102, shown in phantom. In this embodiment, the capped pour-off nozzle 100 acts as an extension of end wall 32*a* in that it still permits the maintenance of a vacuum seal against end 20*a* and prevents serum flow to aperture 50*a*, when in the contracted or closed configuration shown in FIG. 1.**

Dispensing in any case is achieved by means of a pressurizing device **80*a* as in the description of the embodiment of FIG. 1.**

Figure 7:
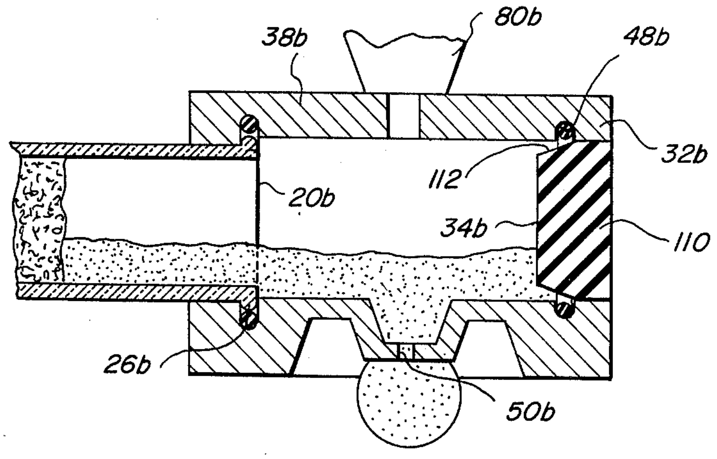
FIG. 7 is a fragmentary sectional view similar to that of FIG. 2, but illustrating the embodiment of FIG. 6.

Turning now to FIGS. 6 and 7, still another embodiment is illustrated wherein the blood inlet end coincides with the dispensing chamber, as must be the case when a single-ended tube is used. Parts similar to those previously described bear the same reference numeral to which the distinguishing suffix "*b*" is appended. Thus, the separation compartment is a container **12*b* the walls 14*b* of which close upon themselves at end 18*b*, such as in the device shown in U.S. Patent No. 3,852,194. The gel plug 24*b* in his case must be located, prior to centrifuging, in the cell-collecting portion of the compartment which is distal to end 20*b*. Container 30*b* is constructed substantially identically as in the embodiment shown in FIG. 1, except that end wall 32*b* includes at least a portion 110 which is a flexible elastomer or a rigid synthetic plastic capable of penetration by a cannula to permit blood intake. Thus, portion 110 functions as a septum, and any self-sealing natural or synthetic elastomer or plastic suffices, such as butyl rubber. By beveling portion 110 at the juncture of inner surface 34*b* with side walls 38*b*, FIG. 7, an annular groove 112 for receiving end 20*b* in sealed relationship is formed, FIG. 6. The seal permits container 12*b* to be evacuated, the vacuum of which is used to draw in blood when a cannula is pushed through portion 110 while end wall 32*b* otherwise seals end 20*b*. Alternatively, the blood can be added to container 12*b* as shown in the above-noted U.S. Pat. No. 3,852,194, and the container 30*b* can be then mounted over container 12*b* for the centrifuge step and dispensing as described hereafter. The flexible portion 110** in such a case serves as an adequate stopper for the centrifuging step.

Side walls **38*b* preferably are provided, as in the embodiment of FIG. 2, with a groove 44*b*, and optionally, a groove 48*b* and O-ring 49*b*, to receiver rim 26*b* of end 20*b*. Alternatively, groove 48*b* can be formed entirely within end wall 32*b*, such as by molding, and portion 100 can be of reduced diameter such that portion 110 does not take part in the sealing of end 20*b* to end wall 32*b***.

Dispensing is achieved as described concerning the embodiment of FIG. 1, by sliding container **30*b* to its expanded position, FIG. 7, thus opening the shear valve to permit flow of serum to aperture 50*b* unblocked by the sliding motion. The dispensing chamber so formed again includes the gel 24*b* repositioned transversely across container 12*b*** to seal the serum from the cellular portion of the blood.

As in the embodiment of FIG. 1, the telescoping of the two containers **12*b* and 30*b* can be achieved by a screw thread as shown in the embodiment of FIG. 4.**

Figure 8:
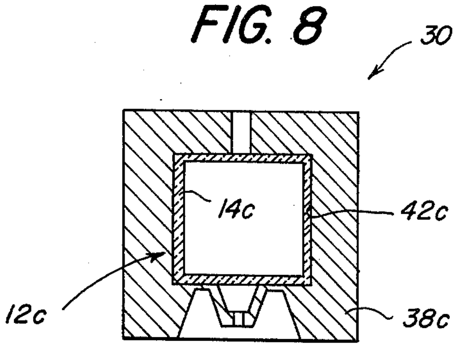
FIG. 8 is a sectional view similar to FIG. 3, but illustrating still another embodiment of the invention.

FIG. 8 illustrates a further modification wherein the walls of the separation compartment are no longer cylindrical. Similar parts bear the same reference numerals with a suffix "*c*". Thus, the containers **12 *c* and 30*c* are formed and function together as described above for the embodiment of FIGS. 1 or 6, except that opposed walls 14*c* form a 4-sided, preferably right-angled tube, to which the interior surface 42*c* of walls 28*c* are matched, to illustrate that other shapes of container 12** are contemplated.

In all of the preceding embodiments, it will be appreciated that the container 30 used for dispensing can be added onto a conventional vessel containing serum, separated in any manner from blood cells, for dispensing the serum in the manner of the invention. For example, container 12 can be a "Corvac" container manufactured by Corning Glass Works, to which container 30 is added after the sample has been centrifuged.

The invention has been described in detail with particular reference to certain preferred embodiments thereof, but it will be understood that variations and modifications can be effected within the spirit and scope of the invention.

What is claimed is:

1. A device comprising, in combination, a blood serum separation compartment having wall means extending between two opposite ends one of which is open for serum flow, and telescoped over said open end, a serum dispensing container comprising wall means including an end wall and side walls encompassing said compartment, said side walls including a dispensing aperture and a pressurizing aperture, said compartment and said container being movable between a first position for receiving a sample in which said end wall provides an airtight seal against said compartment open end and said dispensing aperture being removably blocked from serum flow communication with said compartment by a portion of said wall means of said compartment and a second position for dispensing serum in which said open end is unblocked for flow of serum into said container and said dispensing aperture when said container end wall is moved away from said open end, sealing means for providing an airtight seal between said compartment and said container when in said second position, and a thixotropic gel phase separator disposed in sealing position within said compartment against said container end wall.

2. A serum dispensing device, comprising two containers, mounted one partially within the other for movement between a first position for receiving a sample and a second position for dispensing serum, one of said containers having wall means defining a compartment having opposed ends, one end being open for fluid communication with the other container;

said other container comprising an end wall and side wall means extending from said end wall and encompassing at least said one open end of said one container;

said side wall means of said other container having a dispensing aperture extending from the interior to the exterior surface thereof;

in said first position said end wall of said other container being removably sealed in a substantially airtight relation against said one end of said first container, and said aperture being removably blocked from fluid communication with said compartment of said one container by a portion of said wall means of said one container;

and means for sealing together said side wall means of said other container and said wall means of said one container during and after movement of said containers to said second position.

3. The device as defined in claim 2 wherein said containers are telescoped together along a common axis.

4. The device as defined in claim 2 wherein said opposed walls have an interior surface and wherein said sealing means include a groove said surface extending completely around said one container, said groove being adapted to seal against said one end when said end wall of the other container is moved away from said one end.

5. The device as defined in claim 2 wherein said aperture has a maximum dimension which is sufficiently small as to prevent gravity flow of serum therethrough, and further including a second aperture in said side wall for pressurizing fluid in said other container, said second aperture being blocked by said one container when said end wall seals said open end.

6. The device as defined in claim 2 wherein said one container is a fluid separation compartment including a fluid-collecting portion adjacent said first end and a movable plug in contact with the walls of said compartment transversely across said compartment, for interrupting fluid flow through the compartment, said plug being provided with means permitting flow of fluid to said collecting portion when a centrifugal force sufficient to initiate separation of blood serum from blood cells is generated from said one end towards the opposite end of the compartment.

7. The device as defined in claim 6 wherein said plug comprises an inorganic thixotropic polymeric gel inert to blood serum, having a specific gravity between about 1.03 and about 1.06 and a viscosity between about 400 and about 500 poises at a shear rate of about 500 $sec.^{-1}$.

8. The device as defined in claim 2 wherein said containers are free of a separate valve positioned to block flow between said compartment and said aperture.

9. The device as defined in claim 2 wherein said one side wall has an inner and an outer surface, and a platform for supporting a pendant drop, connected to and spaced away from the said outer surface by a connecting surface, the distance betwen the platform and said outer surface being sufficient to prevent dispensed fluid from spreading from the platform to said outer surface, the connecting surface being inclined at an angle with repsect to said platform which will confine the drop to the platform, the transition zone between the exterior surface of the platform and the connecting surface being sufficiently sharp as to form an edge which will confine the drop to said exterior surface, said platform including said aperture capable of providing pressurized flow from the interior of said other container, said aperture having a maximum dimension which is insufficient to permit gravity flow of fluid through the aperture, said platform exterior surface defing a drop-contacting area which will support a drop having a volume between about 1 and about 30 $\mu$1.

10. The device as defined in claim 2 wherein at least a portion of said end wall is a flexible elastomer capable of penetration by a cannula, whereby body fluid can be added to said containers through the end wall when it is sealed against said open end.

11. The device as defined in claim 2 wherein said two containers are vacuum-sealed together.

12. The device as defined in claim 2 wherein said one side wall has an inner and an outer surface, and a platform for supporting a pendant drop, said platform being connected to said side wall in a manner which is sufficient to prevent spreading of drops of dispensing fluid onto said outer surface;

said platform having an exterior surface defining a drop-contacting area which will support a properly formed drop having a predictable, substantially fixed volume in a range between about 1 and about 30 $\mu$1.

13. The device as defined in claim 2, wherein at least said one container is partially evacuated.

14. A blood serum collection, separation and dispensing device, comprising two generally elongated container each having first and second opposed ends, a portion of one of the containers being mounted within the other container for movement between a first position for receiving a sample and a second position for dispensing serum, said one container including 1. wall means defining a serum collection and separation compartment open at at least one end for fluid communication with the other container, and
2. movable phase separator plug means in contact with said wall means transversely across said compartment for maintaining separation of blood phases and for interrupting fluid flow through said one container, said plug means being capable of movement with respect to blood serum in said compartment when a centrifugal force is generated within said one container;

said other container comprising a. walls having interior surfaces dimensioned so as to accommodate said portion of the one container between them, one of said walls being an end wall removably and completely closing off and covering said open end to provide an airtight seal;
b. a second of said walls of the other container being provided with a dispensing aperture extending from the interior to the exterior surface thereof;

said containers further including sealing means for providing an airtight seal between the interior surfaces of said other container and the exterior of said one container when said end wall is moved away from said open end, said aperture being located so as to be between said one wall and said sealing means when said one wall is moved away from the open end;

whereby serum is cofined within said one container when said one wall covers said open end, and flows into said other container and said aperture when said one wall is moved away.

15. The device as defined in claim 14 wherein said cotainers are telescoped together along a commn axis, said other container being slidable with respect to said one container from a closed position in which said one wall is sealed against said open end, to an open position wherein said sealing means seals said containers together.

16. The device as defined in claim 15 wherein said sealing means is a groove within said interior surfaces shaped to accommodate the open end of said one container.

17. The device as defined in claim 15 wherein at least a portion of said one wall is a self-sealing flexible elastomer capable of self-sealing penetration by a cannula, whereby whole blood can be added to said containers through said one wall when said other container is in its closed position.

18. The device as defined in claim 15 wherein said aperture has a maximum dimension which is sufficiently small as to prevent gravity flow of serum therethrough, and further including a second aperture in said walls, generally opposite to said first aperture, for pressurizing serum in said other container, said second aperture being blocked by said compartment portion when said other container is in said closed position.

19. The device as defined in claim 14 wherein said other container is telescoped over said open end with said second wall in an overlapping, sliding relationship with said portion of said compartment, whereby said second wall and said portion from a shear valve with respect to said aperture.

20. The device as defined in claim 14 wherein said containers are free of a separate valve positioned to block flow between said compartment and said aperture.

21. The device as defined in claim 14 wherein said plug comprises an inorganic thixotropic polymeric gel inert to the serum, having a specific gravity between about 1.03 and about 1.06 and a viscosity between about 400 and about 500 poises at a shear rate of about 500 $sec.^{-1}$.

22. The device as defined in claim 14 wherein said second wall has an inner and an outer surface, and further including a platform, for supporting a pendant drop, connected to and spaced away from the said outer surface in a manner sufficient to prevent dispensed serum from spreading from the platform to said outer surface, said platform including said aperture in fluid communication with the interior of said other container, said aperture having dimensions smaller than that which will permit gravity flow of serum from the container, said platform exterior surface defining a dropcontacting area which will support a properly formed drop having a predictable, substantially fixed volume in a range between about 1 and about 30 $\mu$l.

* * * * *

UNITED STATES PATENT AND TRADEMARK OFFICE

CERTIFICATE OF CORRECTION

PATENT NO. : 4,052,320

DATED : October 4, 1977

INVENTOR(S) : Raymond F. Jakubowicz

It is certified that error appears in the above-identified patent and that said Letters Patent are hereby corrected as shown below:

Column 4, line 26, "Pryzbylowicz" should read --Przybylowicz--.

Column 5, line 26, "torwards" should read --towards--.

Column 7, line 60, after "poly(styrene)" --,-- should be inserted.

Column 9, line 66, "his" should read --this--.

Column 10, line 23, "receiver" should read --receive--.

Column 10, line 48, "28c" should read --38c--.

Column 11, line 54, after "groove" --in-- should be inserted.

Column 12, line 21, "betwen" should read --between--.

Column 12, line 37, "defing" should read --defining--.

Column 12, line 52, "dispensing" should read --dispensed--.

Column 12, line 62, "container" should read --containers--.

UNITED STATES PATENT AND TRADEMARK OFFICE

CERTIFICATE OF CORRECTION

PATENT NO. : 4,052,320

DATED : October 4, 1977

INVENTOR(S) : Raymond F. Jakubowicz

It is certified that error appears in the above-identified patent and that said Letters Patent are hereby corrected as shown below:

Column 13, line 31, "cofined" should read --confined--.

Column 13, line 36, "cotainers" should read --containers-- and "commn" should read --common--.

Column 14, line 43, "dropcontact-" should read --drop-contact- --.

Signed and Sealed this

*Twenty-eighth* Day of *February 1978*

[SEAL]

*Attest:*

RUTH C. MASON
*Attesting Officer*

LUTRELLE F. PARKER
*Acting Commissioner of Patents and Trademarks*

Disclaimer 4,052,320.—*Raymond F. Jakubowicz*, Manchester, N.Y. TELESCOPING SERUM SEPARATOR AND DISPENSER. Patent dated Oct. 4, 1977. Disclaimer filed Nov. 28, 1979, by the assignee, *Eastman Kodak Company*.

Hereby enters this disclaimer to claims 2–5 and 8–13 of said patent.

[*Official Gazette, March 4, 1980.*]